(12) United States Patent
Liu et al.

(10) Patent No.: US 7,100,631 B2
(45) Date of Patent: Sep. 5, 2006

(54) MULTIFUNCTION PASSIVE AND CONTINUOUS FLUID FEEDING SYSTEM

(75) Inventors: Tay-Jian Liu, Lung-Tan Hsiang (TW); Chien-Hsiung Lee, Lung-Tan Hsiang (TW); Yea-Kuang Chan, Kung-Kuan Hsiang (TW)

(73) Assignee: Atomic Energy Council-Institute of Nuclear Energy Research, Taoyuan Hsien (TW)

( * ) Notice: Subject to any disclaimer, the term of this patent is extended or adjusted under 35 U.S.C. 154(b) by 303 days.

(21) Appl. No.: 10/288,704

(22) Filed: Nov. 6, 2002

(65) Prior Publication Data

US 2004/0084081 A1 May 6, 2004

(51) Int. Cl.
*G05D 7/06* (2006.01)

(52) U.S. Cl. ............... 137/208; 137/486; 137/487.5
(58) Field of Classification Search ............. 137/208, 137/209, 486, 487.5
See application file for complete search history.

(56) References Cited

U.S. PATENT DOCUMENTS

| | | | | |
|---|---|---|---|---|
| 3,805,819 A | * | 4/1974 | Etter | 137/208 |
| 5,148,945 A | * | 9/1992 | Geatz | 137/208 |
| 5,678,591 A | * | 10/1997 | Merrifield et al. | 137/208 |
| 5,727,525 A | | 3/1998 | Tsuzuki | |
| 5,845,713 A | | 12/1998 | Sudholm | |
| 5,845,714 A | | 12/1998 | Sundholm | |
| 6,006,840 A | | 12/1999 | Sundholm | |
| 6,035,829 A | | 3/2000 | Hartke et al. | |
| 6,120,711 A | | 9/2000 | Takizawa | |
| 6,170,512 B1 | * | 1/2001 | Lai et al. | 137/209 |
| 6,273,067 B1 | | 8/2001 | Bazinet | |

* cited by examiner

*Primary Examiner*—Stephen M. Hepperle
(74) *Attorney, Agent, or Firm*—Senniger Powers

(57) ABSTRACT

The present invention is to provide a kind of multifunction passive and continuous fluid feeding system for external systems, the fluid-feed system including a storing and transmitting component, a measuring and regulating component, and a control unit characterized by: pressurizing from above fluid level surface of the feed fluid tank by high-pressure gas supply source to fulfill the passive fluid feeding function, performing the feed fluid measuring and regulating through the flow meter and flow control valve installed on the transmission pipe lines connecting to the external systems, fulfilling function of continuous fluid feeding by switching between two fluid-feed tanks, and combining the feed fluid requirements of the external systems through the control unit to achieve the multifunction fluid-feed art of automatic operation, continuous fluid feeding, and flow rate controlling. The present invention does not utilize high-head and high-pressure pumps as the driving components, thus it is not only cost-saving but makes easier in coping with various fluid-feed requirements by the external systems, hence, possessing potentials of extending applicability into various industrial fields.

8 Claims, 7 Drawing Sheets

| First Tank Operation Cycle | | | | Second Tank Operation Cycle | | | |
|---|---|---|---|---|---|---|---|
| Critical Time Point | Function | Valve Action(s) | Trigger Signal | Critical Time Point | Function | Valve Action(s) | Trigger Signal |
| $a_0$ | Start Fluid Feeding | Open Valve 27 | $L_2(Lo)$ | $b_0$ | Start Fluid Feeding | Open Valve 28 | $L_1(Lo)$ |
| $a_1$ | Stop Fluid Feeding Switch Tank | Close Valve 27 Open Valve 28 | $L_1(Lo)$ | $b_1$ | Stop Fluid Feeding Switch Tank | Close Valve 28 Open Valve 27 | $L_2(Lo)$ |
| $a_2$ | Start Venting | Open Valves 25, 32 | - | $b_2$ | Start Venting | Open Valves 26, 32 | - |
| $a_3$ | Start Fluid Supply | Open Valve 23 | $P_1(Lo)$ | $b_3$ | Start Fluid Supply | Open Valve 24 | $P_2(Lo)$ |
| $a_4$ | Stop Fluid Supply | Close Valve 23 | $L_1(Hi)$ | $b_4$ | Stop Fluid Supply | Close Valve 24 | $L_2(Hi)$ |
| $a_5$ | Stop Venting | Close Valve 32 | - | $b_5$ | Stop Venting | Close Valve 32 | - |
| $a_6$ | Start Pressurizing | Open Valve 22 | - | $b_6$ | Start Pressurizing | Open Valve 22 | - |
| $a_7$ | Stop Pressurizing | Close Valves 22, 25 | $P_1(Hi)$ | $b_7$ | Stop Pressurizing | Close Valves 22, 26 | $P_2(Hi)$ |
| $a_7$–$a_8$ | Standby | - | - | $b_7$–$b_8$ | Standby | - | - |

FIG. 3

MULTIFUNCTION PASSIVE AND CONTINUOUS FLUID FEEDING SYSTEM

BACKGROUND OF THE INVENTION

1. Field of the Invention

The present invention is to provide a multifunction passive and continuous fluid feeding system for external systems, wherein the system is capable of performing multifunction fluid feeding tasks for automatic operation, continuous fluid feeding, and control based on various fluid-feed requirements by the external systems.

2. Description of the Background Art

In the realm of conventional fluid feeding techniques, the most commonly seen practice is to employ pumps with adequate head as the driving component to inject the feed-fluid to the external systems. An example of this practice is the high-pressure water injection system of nuclear power plants, which automatically activates at time of depressurization during incidents to inject coolant into reactor core for removing the decay heat generated therein. Another practice is to employ accumulators as the driving component to inject fluid therein by the high-pressurized gas contained therein to the external systems. Examples of these conventional practices include the inventions disclosed in U.S. Pat. Nos. 5,845,713, 5,845,714, and 6,006,840, relating to the roof spray fire extinguishing system employing nitrogen cylinders as pressure supplying source to press the nitrogen gas into the tanks stored with extinguishing liquid, transmitting the extinguishing liquid through pipe lines on the roof into the sprinklers on the ceiling to put out a fire. Also, for the above-mentioned example of the water injection system of nuclear power plants at time of depressurization during incidents, it can automatically inject the pre-pressurized water to the reactor core, when the system pressure lowers to the preset level for activating to remove the decay heat generated therein. Furthermore, the fuel supply systems for automobile engines as disclosed in U.S. Pat. Nos. 6,273,067, 6,035,829, 5,727,525, and 6,120,711, employ high-pressure pumps to first transmit the fuel contained in the fuel tank into pressurized accumulator for storage, and then control the on-off periods of the fuel spray nozzles in each cylinder by sequential ignition of the cylinder strokes, enabling the fuel-feed into the combustion chamber by pulse in a cyclic manner.

When the above-mentioned conventional fluid-feed practices are applied in systems with high pressure and high temperature, or large scaled industrial systems, the costs of investment solely made on the high-head pumps will be astonishing. Besides, in any power plant or factory facility, when emergency incidents occurs, the major power supply is usually shut down first, with only the emergency power supply system left to provide lower rating power for use by minimum lighting and instrumentation. To maintain normal fluid-feed functioning, the installation of reliable emergency power supply system of higher rating is needed; otherwise, more severe damages may occur due to the failure of fluid-feed function. In addition, the cooling practice by using accumulators to inject water into the reactor core may not, in some incidents, be able to bring the pressure of the system smoothly down to the triggering point preset for the accumulator to activate water injection, for instance, when there is a break of less than 2 inches in diameter at the cold leg, or when loss-of-coolant incidents occur, resulting from small break due to fracture on the instrumentation pipe lines, or, with the low depressurization rate, the water injection may still be grounded to almost a halt, even though the water injection system may have been activated when the preset triggering point is reached, causing poor cooling results of the reactor core.

Furthermore, in the fields of on-line reaction control in some chemical continuous processes and other industrial or academic researches, it is not difficult to see the needs of the feed fluid flow rate varying with the changes of one or more key parameters of the external systems. As a result, even if the systems are equipped with the above-mentioned expensive pumps, it does not necessarily ensure the accuracy of fluid feeding function. For instance, a small pilot plant can run simulation tests in advance of the actual operations of fluid feeding at different pressure levels in the prototypical plants, with the prototypical plants having preset the pumps to drive the fluid feeding, or, namely, the feed fluid flow rate is to vary at different pressure levels throughout the process, according to the performance curve of the fluid feeding pumps. Hence, to accurately simulate the feed fluid flow rate in the pilot plants will be critical to successful simulation of the actual processing of the prototypical plant. However, when a pilot plant directly uses pumps to simulate the feed fluid flow rate, it needs to overcome the inevitable extreme differences between the two sets of performance curves due to the significant specification differences of the two pumps. Even if the pilot plant can be equipped with an additional set of sophisticated mechanism for the pump to automatically adjust its rotation rate, the pump is still difficult to fully meet the requirement of accurate fluid feeding simulation. The above mentioned problems commonly seen during the fluid feeding simulation tests in pilot plants should be solved by simple, economic, and reliable methods.

Moreover, the feed fluid supply system currently applied in fire engines also uses high-head and high-pressure pumps as the driving component which injects the extinguisher in the feed fluid tanks to the fire scenes. As a series of pumps in the above mentioned application are connected for purpose of enhancing the head so as to achieve effectiveness by increasing the injection range and height, particularly those designed for high-rise fire fighting operation, and outside of consideration of public safety at the fire scene, power supply is shut down prior to fire fighting operation. Therefore, fire engines have to be equipped with built-in diesel electric sets for supplying power to its own pumps, making the power equipment for driving fluid feeding on the fire engines rather heavy-weighted and bulky. Apart from the noise of the pumps that deteriorates the communication quality at the fire scene, with the limited space available on the vehicles, they squeeze out the amount of extinguisher that can be carried along, and as a result, it is unfavorable for the mobility of the fire engines, while increasing difficulty for fire fighting operation in small alleys. The complicated electric equipment installed on the vehicle also makes it inconvenient to do regular maintenance and performance tests. In case when an effective fluid feeding mechanism is lacking before the extinguisher runs out, the function of fire extinguishing will be interrupted or gone.

To overcome the deficiencies of the above-mentioned conventional practices, an object of the present invention is to provide a multifunction passive and continuous fluid feeding system for external systems, including a storing and transmitting component, a measuring and regulating component, and a control unit, characterized by pressurizing from above the fluid level surface of the feed fluid tank by high-pressure gas supply source to build up the passive fluid-feed supplying function, performing the fluid-feed measuring and regulating through the flow meter and flow control valves installed on the transmission pipe lines connecting to the external systems, fulfilling function of continuous fluid feeding by switching between two fluid-feed tanks, and combining the feed fluid requirements of the external systems through the control unit to achieve the multifunction fluid-feed of automatic operation, continuous fluid feeding, and flow rate controlling.

The automatic continuous fluid feeding system of the present invention utilizes cheap and reliable high-pressure gas supply to take the place of the conventional expensive high-head high-pressure pumps and the high rating power suppliers. Not only does it carry the functionality of conventional fluid feeding system, but also the potentials of extended applicability into various systems or industrial fields, due to the easiness of its coping with various fluid-feed requirements by external systems. Apart from solving the problem of continuity deficiency of the conventional fluid feeding systems which results from at least one of the accumulators operable independently as sources of feed fluid supply, the adding of automatic switching control mechanism to the feed fluid tanks allows significant downscaling of the feed fluid tank volume and the overall fluid feeding system. Furthermore, the adding of control unit not only allows continuous fluid feeding by automatic switching through measuring and regulating components. It also demonstrates its functionality with high accuracy in controlling flow of feed-fluid. Accordingly, the present invention can easily surpass the difficulties by the conventional systems, while improving their reliability and functionality. Therefore, from the viewpoint of risk management, the present invention is particularly applicable, when fluid feeding is required over a long period of time, or fluid feed system stays normally in reserve but activates its fluid-feed function at time of emergency, or accurate control over feed fluid flow rate is required based on various fluid-feed requirements by external systems.

In summary, the object of the present invention is to provide a kind of multifunction passive and continuous fluid feeding system, which is of simple structure and high reliability, for external systems, wherein the system is capable of performing multifunction fluid feeding skills for automatic operation, continuous fluid feeding, and flow rate control based on various fluid-feed requirements by the external systems. Besides being highly reliable, capable of lowering disaster risks, the present invention has the advantages of cost effectiveness, energy saving, environmental friendliness, and conveniences for maintenance and performance testing, as well as the potentials of extended applicability into various fields. The application fields of the present invention at least include the following: the fluid feeding or cooling systems as emergency back-up system for industrial purposes, the fluid feeding systems for high-temperature and high-pressure boilers, on-line inputs proportion control in chemical continuous processes, safety water injection system within full range of pressure variation in nuclear reactors, feed-water and level controlling system for steam generators, fluid feeding simulation tests in pilot plants, and various types of public safety and fire extinguishing systems.

SUMMARY OF THE INVENTION

The present invention provides a multifunction passive continuous fluid feeding system capable of performing automatic operation, continuous fluid feeding, and controlling flow rate, based on various feed-fluid requirements by the external system, such that the fluid feed system can provide multifunction fluid feed methods and devices. The invention comprises a storing and transmitting component, a measuring and regulating component, and a control unit, respectively described below:

(1) The Storing and Transmitting Component

The storing and transmitting component at least includes two independent feed fluid tanks and three transmission lines, the feed fluid tank being an air-compressed tank storing feed fluid, the transmission lines being connected to feed fluid tanks, with both respectively connected to a fluid supply source, a gas supply source and an external system. The feed fluid tanks are installed with measuring equipment (for controlling over fluid level, pressure, temperature, and so on), so as to monitor the state of the feed fluid stored therein in timing manner, also to serve as index for activating control mechanism. The feed fluid tank volume is determined by the requirements of the external system, as well as the operation duration. However, as the present invention adapts operation mode by switching between two tanks to enhance continuous fluid feeding function, the determination of tank volume will not be affected by the concerns over requirements of external system or operation duration, and thus can be reduced to reasonable extent. Prior to use, the invention comprises the steps of: filling the tank with feed fluid through a fluid inlet pipe connected to the source of fluid supply to 75%~85% of the tank volume, closing the fluid inlet isolation valves of the two feed fluid tanks, pumping in air or nitrogen through a gas inlet pipe connected to the source of a gas supply to the remaining room in the tanks, keeping on pressuring until the pressure exceeds the predetermined value of the external systems, and then closing the gas inlet isolation valves to return to the initial standby state.

The fluid feed function is activated with the opening of the feed fluid isolation valve at the bottom of one of the feed fluid tanks, and the tank pressure can be maintained, or replenished at time of feeding operation, depending on actual needs, by automatic or manual pressure regulator. When the lowest-level warning signal is indicated, with the speedy switching of the valve sets, the fluid feeding operation is switched over, from the one tank having been running fluid feed operation, to the other one having been at initial standby state, thus continuing with the operation. By doing so, not only can the gas inside the tanks be prevented from entering the external system by incident, but also can the tanks be rebuilt to the initial standby state while the other tank is in charge of the fluid feeding. With such cyclic switching operation mode, the system of the present invention can meet long-term requirements of the external systems, enabling the function of continuous fluid feeding to be achieved.

(2) The Measuring and Regulating Component

The measuring and regulating component includes a measuring instrument and valves installed on the transmission pipe lines between the feed fluid outlet and the inlet of the external systems, being the main part performing the measuring and flow controlling of the feed fluid. Accurate controlling of the flow of feed fluid can be achieved through various types of valves. For example, by means of electric current/pressure (I/P) converter, pneumatic flow control valve can control the valve opening, while the actual flow rate as measured by the associated flow meter can serve as cross reference in comparison. The control unit can automatically regulate the opening of the control valves to quickly rectify the flow rate of the feed fluid, so that the accuracy of the fluid feeding control meet requirements by the external systems.

The measuring of the flow rate, for instance, can be obtained through the pressure differential measured by the pressure transmitter that is connected on both ends of the flow meter, together with the calibration curve associated with the flow meter. When the pressure transmitter detects pressure differentials, it outputs 4–20 mA electric current signals linearly based on the value of the pressure differentials, and connects to a 250 Ω precision resistor on the output circuit, to convert the 4~20 mA electric current signals into 1~5V voltage signals. The measuring of the above-mentioned flow rate can also be obtained by adapting other types of flow meters to get the output signals directly.

The function of the throttle valves installed at each end of the flow control valve, apart from adjusting the application range of the feed fluid flow rate, is to lower the excessive valve coefficient (Cv) variations resulting from the pressure differentials between the up and down streams of the control valve, thus increasing the stability of the flow rate after the regulation by the control valve. In addition, the check valves installed on each transmission pipe line ensure that under no circumstance will the feed fluid in the tank flow back to the sources of the fluid supply and gas supply, and prevent fluid in the external system from flowing back to the feed fluid tanks.

(3) The Control Unit

There are two major functions of the control unit, one being fulfilling various fluid feed requirements by the external systems through the system of the present invention, the other being enabling the system of the present invention to achieve the functionality of continuous fluid feeding through automatic operation and feed fluid control.

Meeting various fluid feed requirements by the external system, through the adapting of control unit, is accomplished by adapting a set of reliable control mechanism to accurately control the fluid feeding flow rate, when the flow rate is a function of the one or several key parameters of the external system. For instance, the flow rate of the feed fluid is a function of the dynamic changes of the pressure in the external systems; or the flow rate of the feed fluid is a function of the dynamic changes of the fluid level of some certain components of the external system; or the flow rate of the feed fluid is a function of the dynamic changes of the pressure and position of some certain components of the external system, etc. The accomplishment of the above-mentioned functions is made tangible through the functional correlations of the feed fluid control parameters and the calibration curve built in the control unit, with these data being checked against the on-line acquisition signals of the measuring parameters, and a regulating component driven by human-machine interface (e.g. actuator of the control valve) rectifying the fluid feeding immediately, such that the flow rate of the feed fluid varies with the change of the one or several key parameters of the external system, with the variations following a certain functional correlations, and thus the system fulfills the fluid feeding requirements.

Another major function of the control unit is to enable the system of the present invention to fulfill the function of continuous fluid feeding by automatic operation and feed fluid control. As mentioned above, to correspond to the function of continuous fluid feeding, the operation mode of the present invention is to keep one of the tanks running, while letting the other return to the initial standby state, and when the feed fluid tank being running sends out the lowest level warning signal, the system again automatically switches to the other feed fluid tank which has been back to the initial standby state. The accomplishment of the above-mentioned functions is through a control unit monitoring the state of the feed fluid in the fluid feeding tank (e.g. fluid level and pressure) for controlling the open/close states of each isolation valve in charge of gas or fluid supply, gas venting, fluid feeding, and the two tanks switching. The open/close states of the above mentioned isolation valves follow fixed pattern of actions depending on the state of the two feed fluid tanks, with the actions in cyclic operation mode.

To achieve the object stated by the present invention (FIG. 1) as of meeting the various fluid feed requirements of the external systems, and continuous fluid feeding by automatic operation and feed fluid control, the built-in information preset in the control unit should include the following: the data needed for measuring and testing, data on feed fluid control requirements by the external systems, and data enabling the devices of the present invention to perform the functions of automatic control and continuous fluid feeding. The detailed function of each critical time point (FIG. 2), the actions of the isolation valves, and the measuring signals for triggering actions during the operation cycles of the first and the second feed fluid tanks as illustrated in FIG. 3, are to be further described in "Detailed Description of the Preferred Embodiments".

The control unit comprises: a data acquisition and controller, an input signal module, an output signal module, and a signal transmitter, the input signal module acquiring the original signals of each measuring instrument, (e.g. pressure, temperature, and fluid level), the output signal module transmitting 4–20 mA control signals to rectify the opening of the flow control valve. The signal transmitter transmits and receives signals, featuring reducing interfering noise and fast transmission. The data acquisition and controller instantaneously gathers the original signals of each measuring instrument, converts the signals into physical quantities, and is then compared and judged against the built-in data preset in the control unit. After that, the function of automatic operation of continuous fluid feeding is accomplished through the decisions on whether or not the open/close state of each of the isolation valve controlling the gas or fluid supply, gas venting, fluid feeding, and the two tanks switching. When the above-mentioned measuring signals meet the preset action signals built in the control unit, (e.g. high/low fluid level, and high/low pressure), the control unit will send out action commands for execution through human-machine interface. The function of feed fluid flow rate control is accomplished through a human-machine interface driven flow control valve to instantaneously rectify the feed fluid flow rate. With the above-mentioned control unit performing the integrated functions of data acquisition, storing, comparisons and judgments, and giving control commands, the present invention achieves the functionality of continuous fluid feeding by automation operation and feed fluid control.

BRIEF DESCRIPTION OF THE DRAWINGS

FIG. 3 is a characteristic diagram showing the function of each critical time point, the actions of isolation valves, and the measuring signals for triggering the actions during the operation cycles of the first and the second feed fluid tanks according to the present invention;

DETAILED DESCRIPTION OF THE PREFERRED EMBODIMENTS

As mentioned above, the object of the present invention is to provide a kind of multifunction passive and continuous fluid feeding system, which is of simple structure and high reliability, for external systems, wherein the system is capable of performing multifunction fluid feeding skills for automatic operation, continuous fluid feeding, and flow rate control based on various fluid-feed requirements by the external systems. Besides being highly reliable and capable of lowering disaster risks, the present invention has the advantages of cost effectiveness, energy saving, environmental friendliness, and convenience for maintenance and performance testing, as well as the potentials of extending applicability into various fields. The descriptions below are illustrative of the embodiments of the present invention.

Figure 1:
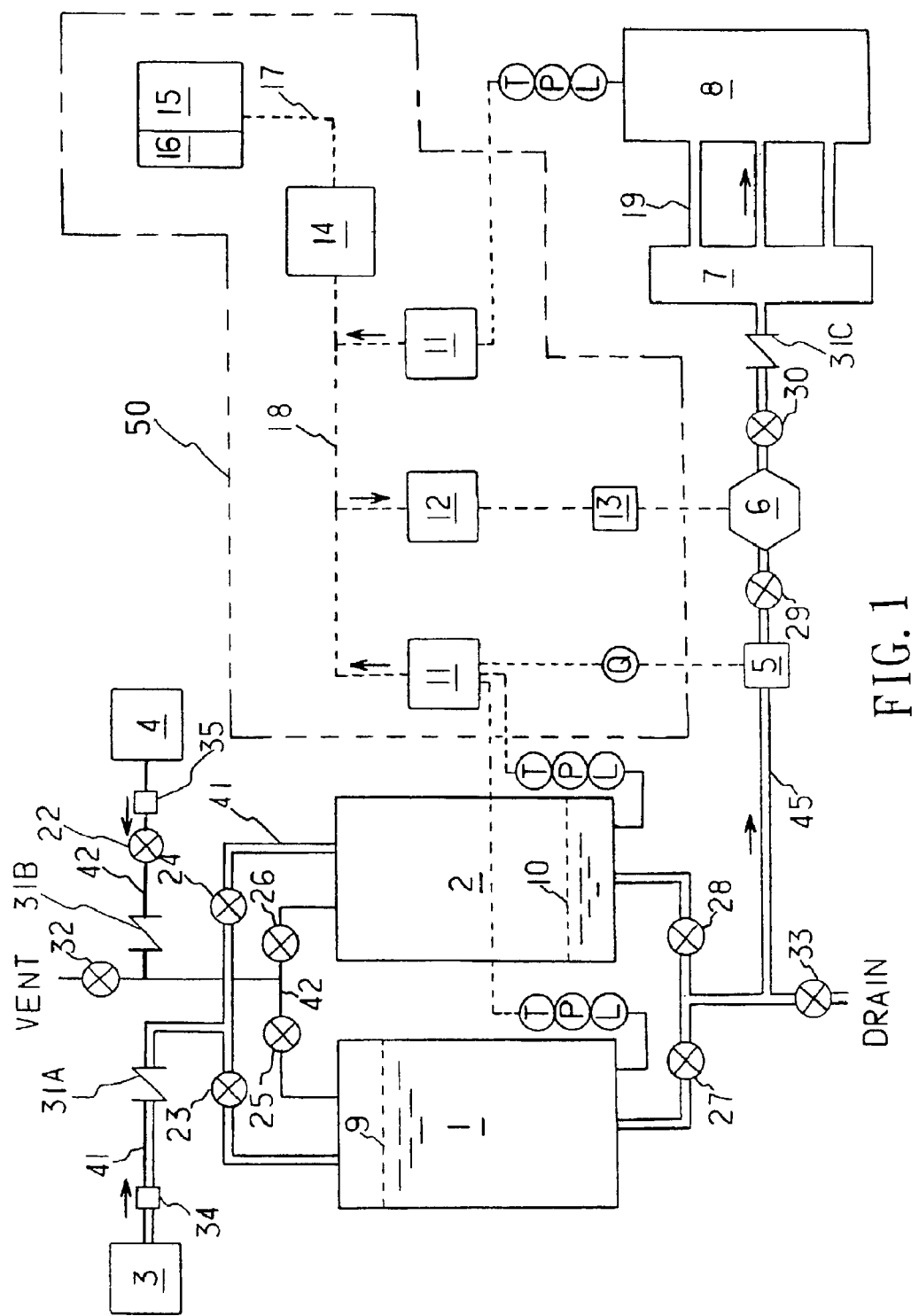
FIG. 1 is a characteristic diagram showing the equipment and system controls of the present invention.

FIG. 1 is a characteristic diagram showing the equipment and system controls of the present invention. The equipment comprises a storing and transmitting component, a measuring and regulating component, and a control unit (50), whereby the above mentioned three components cooperate in performing the function of automatic and continuous fluid feeding based on the requirements of the external systems.

The storing and transmitting component comprises: at least two independent feed fluid tanks (1, 2), wherein the two independent tanks can be two individual tanks or a single tank partitioned into two, serving as the vessels for storing and pressurizing, to accommodate the fluid to be fed into the external systems (8), being two pressurized tanks without substantial division between the gas/fluid interfaces so as to allow direct contact there in-between, or with substantial division between the gas/fluid interfaces capable of balancing the gas/fluid pressure on both sides so as to block direct contact there in-between; a set of transmission pipe lines (41, 42, 45) linked respectively with the feed fluid tanks (1, 2), while being connected to a fluid supply source (3), a gas supply source (4), and an external system (8); wherein the feed-fluid supplying into the feed fluid tanks (1, 2) is operated under such low pressure as near that of the atmosphere, thus can be run by gravity, pumps, or other low pressure fluid supply source, whilst the gas supplying operation can be run by air compressor or high pressure gas cylinder, or both combined; a couple of isolation valves (22 to 28, 32) separately installed on each transmission pipe line (41, 42, 45), the appropriate open/close time sequential control of which enabling functions for fluid supplying, pressurizing to both tanks (1, 2), fluid feeding to the external system (8), switching operation between the tanks (1, 2), etc; and three check valves (31A, 31B, 31C) respectively installed on each transmission pipe line (41, 42, 45) to ensure that under no circumstance will the feed fluid in the tank flow back to the sources of the fluid supply and the gas supply, while preventing the fluid in the external system from flowing back to the feed fluid tanks (1, 2). Furthermore, in case when feed fluid is to be delivered into different locations of the external systems, a pressure-balancing pipe (7) can be installed on the feed fluid pipe (45) close to the fluid inlet of the external systems, with the feed fluid being delivered through the branch pipe (19), thus to significantly simplify the feed fluid control mechanism.

The measuring and regulating component comprises: a flow meter (5) installed on the feed fluid pipe (45) for measuring the feed fluid flow rate (Q); a flow control valve (6) installed on the feed fluid pipe (45) for regulating the feed fluid flow rate, wherein the control valve (6) has two throttle valves (29, 30) installed on both ends of it, for not only regulating the range of the feed fluid flow rate (Q), but also lowering the excessive valve coefficient (Cv) variations resulting from the pressure differentials between the up and down streams of the control valve (6), thus increasing the stability of the feed fluid flow rate after the regulation by the control valve; three sets of measuring instruments installed on the two feed fluid tanks (1, 2) and the external system (8), respectively, for monitoring the state of the feed fluid therein at any time, such as instrument for monitoring level (L), pressure (P), temperature (T), flow rate (Q), pH value, and concentration (C) with the data serving as reference for feed fluid regulating and controlling.

The control unit (50) comprises: at least one input signal module (11) for acquiring original signals of each set of instrument measuring, for instance, pressure (P), flow rate (Q), temperature (T), and level (L); at least one output signal module (12) for transmitting control signals to rectify the opening of the flow control valve (6), by means of utilizing pneumatic control valve, for instance, with the output signal module transmitting a 4~20 mA electric current signal to the electric current/pressure (I/P) converter (13), which converts the linear signals into an output of a 3~15 psi pressure to the gas accumulating chamber of the pneumatic control valve, thus to control the opening of the valve seat; a signal transmitter (14) for transmitting and receiving signals, for instance, RS232/RS485 converter and IEEE488, with RS232/RS485 converter taken as an example because RS485 signal transmission line (18) adapts differential mode of transmission and reception, featuring advantages of reducing interfering noise and fast data transmission over long distance, wherein the distance of its signal transmission ranges up to 1200 meters, much larger than the 12 meters covered by the terminal of RS232 signal transmission line (17) in computer peripheral equipment; a data acquisition and controller (15) for acquiring original signals transmitted by each of the measuring instruments, converting the signals into physical quantities, and comparing against the built-in data preset in the control unit (50) for judging and giving action prompting commands.

To achieve the object of the present invention so as to meet the various fluid feed requirements of the external systems (FIG. 1), and continuous fluid feeding by automatic operation and feed fluid control, the built-in information (16) preset in the control unit (50) should include the following: the data needed for the measuring (e.g. the type of measuring instrument with its calibration curve, performance parameters, and physical properties of the feed fluid and its current state), the data needed for meeting fluid feeding requirements of the external systems (8) (e.g. functional correlation of the feed fluid controlling parameters, physical properties of the external system, and its thermal-hydraulic state), as well as the data enabling the present invention to fulfill the functions of automatic control and continuous fluid feeding (e.g. instrument executing each of the action, timing of the actions, sequence, verification criteria and procedures, and preset signals for warning and triggering actions).

The devices for warning high/low level, such as beeper, flashing indicators (not illustrated in the drawings) can be triggered by the preset high/low level (L) signals as $L_1$ (Hi), $L_1$ (Lo) and $L_2$ (Hi), $L_2$ (Lo) from the level controller installed on the two tanks, or by the level-measuring pressure differential transmitter. By the opening and closing sequence of the automatically controlled isolation valve set (22 to 28, 32) in the control unit (50), such devices will send out commands such as: start fluid feeding, stop fluid feeding, two tank switching, and stop fluid supply, for execution through human-machine interface. Likewise, the devices for warning high/low pressure, such as beeper, flashing indicators (not shown) can be triggered by the preset high/low pressure (P) signals as $P_1$ (Hi), $P_1$ (Lo) and $P_2$ (Hi), $P_2$ (Lo) from the pressure controller installed on the two tanks, or by the pressure transmitter. By the opening and closing sequence of the automatically controlled isolation valve set (22 to 28, 32) in the control unit (50), such devices will send out commands such as: start fluid supply and stop pressurizing, for execution through human-machine interface.

The structure of the multifunctional feed fluid controlling device of the present invention is illustrated in FIG. 1, and the operation methods of using the device for continuous fluid feeding to external system will be described below in details.

Figure 2:
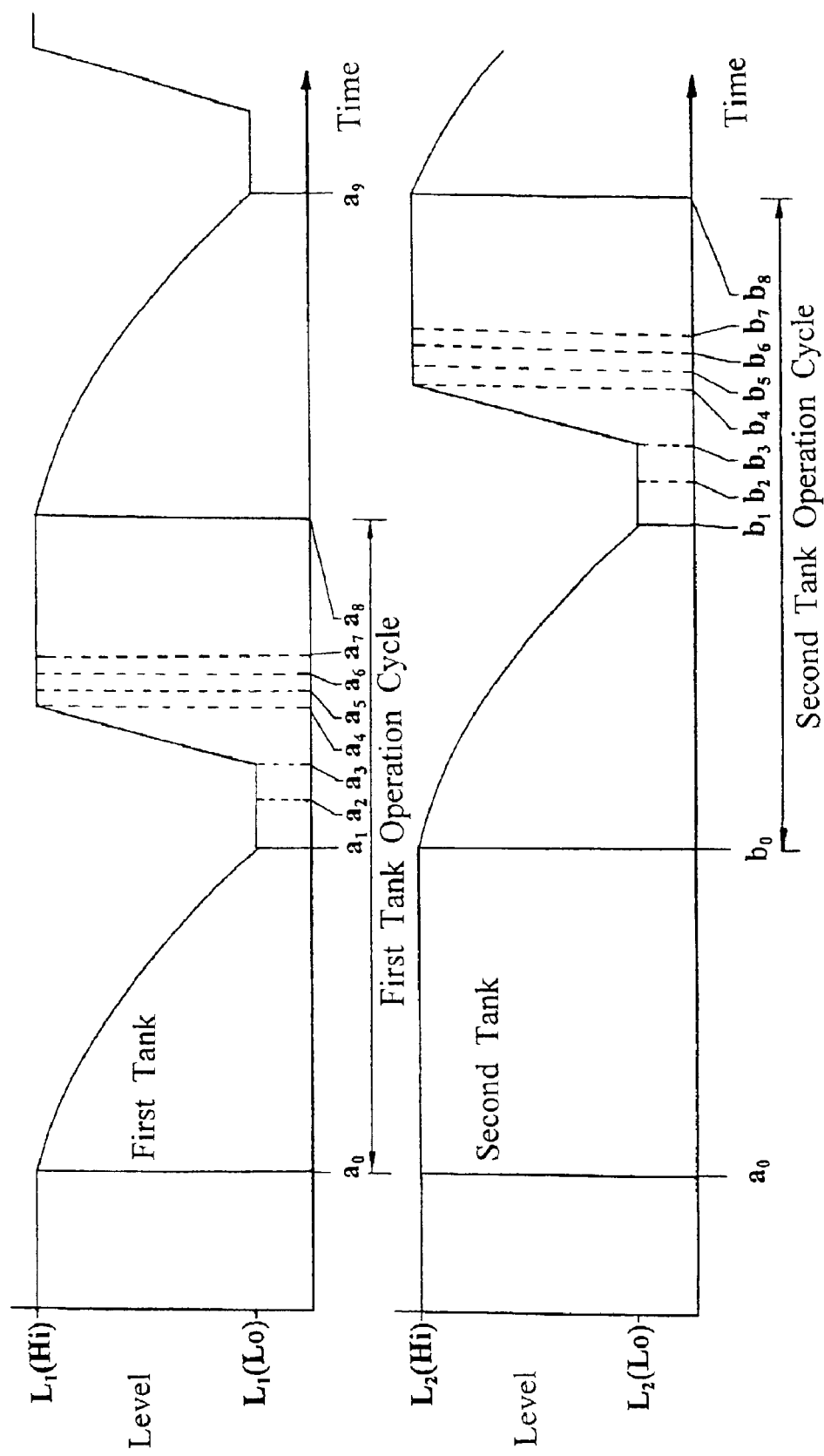
FIG. 2 is a characteristic diagram showing the fluid level changes at each critical time point during the operation cycles of the first and the second feed fluid tanks according to the present invention.

FIG. 2 is a characteristic diagram showing the fluid level ($L_1$, $L_2$) changes at each critical time point in the operation cycles of the first and the second feed fluid tanks (1, 2). Specifically speaking, when the two feed fluid tanks (1, 2) are built up to the initial standby state, and, with the feed fluid isolation valve (27) being opened at a time point $a_0$, the first feed fluid tank starts feeding fluid to the external system (8), while the second feed fluid tank still remains at the standby state. After this, the level ($L_1$) of the first feed fluid tank (1) starts to lower until a time point $a_1$, (or $b_0$ as the corresponding time point for the second feed fluid tank) when its level reaches the low level warning signals $L_1$ (Lo) and stops its fluid feeding action. In place of this, the fluid feed source is switched to the second feed fluid tank (2) to continue with the fluid feeding operation. Hence, the first tank feed fluid isolation valve (27) is closed at this time point and the second tank feed fluid isolation valve (28) is opened. Likewise, after this, the level ($L_2$) of the second feed fluid tank (2) starts to lower, until a time point $b_1$ (or $a_8$ as the corresponding time point for the first feed fluid tank) when its level reaches the low level warning signals $L_2$ (Lo) and stops its fluid feeding action. Again, the fluid feed source is switched this time to the first feed fluid tank (1) to continue with the fluid feeding operation.

After the above-mentioned switching action is executed (at time point $a_1$ or $b_0$), while the second feed fluid tank (2) runs the fluid feed operation ($b_0$~$b_1$), the actions involved in getting the first feed fluid tank built up to the initial standby state ($a_1$~$a_8$) include: at time point $a_2$, the venting isolation valve (32) and gas inlet isolation valve (25) are opened first to vent the gas in the first feed fluid tank; and, soon after this, at time point $a_3$ when the first feed fluid tank pressure lowers down close to that of the atmosphere $P_1$ (Lo), the fluid inlet isolation valve (23) is opened to allow the feed fluid to flow from the fluid supply source (3) into the first feed fluid tank (1); till time point $a_4$ when the feed fluid level reaches the high level warning signal $L_1$(Hi), the isolation valve (23) is closed to stop fluid supply, and at time $a_5$ the venting valve (32) is closed to stop venting; at time point $a_6$ the gas supply isolation valve (22) is opened to allow high pressure gas from the gas supply source (4) to enter into the first feed fluid tank (1) to start pressurizing, through the already opened gas inlet isolation valve (25); till time point $a_7$ when the feed fluid tank pressure reaches up to the preset high pressure value $P_1$ (Hi), the isolation valves (22, 25) mentioned above are closed to stop pressurizing; at this time point $a_7$ when the second feed fluid tank (2) still remains operating the fluid feeding, the first feed fluid tank (1) has been built up to the initial standby state after executing the above-mentioned actions. The above-mentioned state remains until time point $a_8$ (or $b_1$ as corresponding time point for the second feed fluid tank), thus throughout the period of time ($a_1$~$a_8$), the first feed fluid tank (1) remains at standby state, until at time point $b_1$ when the low level warning signal $L_2$ (Lo) of the second feed fluid tank (2) is reached, and the fluid feeding operating is switched back to the first feed fluid tank (1); in addition, throughout the period of time ($a_8$~$a_9$) when the first feed fluid tank runs the fluid feeding operation, the above-mentioned operation mode can be practiced in order for the second feed fluid tank (2) to be built up to standby state throughout the period of time ($b_1$~$b_8$), the repetition of the above-mentioned actions in cyclical manner achieves the continuous fluid feeding function.

The characteristics of the function of each critical time point in the operation cycles of the first and the second feed fluid tanks (1, 2), the actions of isolation valves, and the measuring signals for triggering the actions are illustrated in FIG. 3, wherein the measuring signals for triggering actions are what the control unit (50) depends on in order to open/close the above-mentioned isolation valves. To make sure the above-mentioned actions are executed precisely in the actual operation, consideration should be given to the amount of time needed in order for the isolation valves to perform the mechanic actions. Therefore, except the actions of the two feed fluid isolation valves (27, 28), with one opening while the other closing upon the feeding operation being switched from one tank to the other, which need to be synchronized, as much as possible, the actions of all other isolation valves should allow reasonable time differentials, with each action of the isolation-valves being verified by the control unit (50) to proceed with the following actions, so as to ensure the reliability of the operation. Under normal consideration when designing for the feed fluid tank volume, the time needed for finishing the actions mentioned above to reset a tank to standby state (e.g. $a_1$~$a_7$ time period for the first feed fluid tank, FIG. 2), even when actions are carried out manually and easily, is supposed to be less than the time needed for the other tank to run the fluid feeding operation, when compared with the overall cycle time (e.g. $b_0$~$b_1$ time period for the second feed fluid tank, FIG. 2).

The methods for accomplishing automatic flow rate controlling in the fluid feeding process are: the built-in data preset in the control unit (50) needed for measuring, and data needed for meeting fluid feeding requirements by the external system, with the data compared against the flow rate (Q) actually acquired on-line; when the flow rate (Q) measured does not equal to the built-in flow rate data, the control unit (50) will give commands to the human-machine interface (e.g. the actuator of electric control valve, or electric current/pressure converter of pneumatic control valve) to drive the regulating component of the control valve, so that the flow control valve (6) immediately carry out actions to rectify the feed fluid flow rate, thus accomplishing the function of fluid feeding by automatic control. The measuring of the flow rate can be obtained through the pressure differentials measured by the pressure transmitter connected to the two ends of the flow meter (5), along with the calibration curve of the flow meter (5). The measuring of the above-mentioned flow rate (Q) can also be obtained by adapting other types of flow meters to get the output signals directly. The flow control valve (6) for the present invention are not limited to the pneumatic or electric control valves listed herein; any types of industrial control valves can be applicable as long as they meet the requirements.

The methods for building up initial level (L) and pressure (P) of the two feed fluid tanks to the initial standby state are: building the initial level (L) of the feed fluid tanks (1, 2) first, and then the initial pressure (P) of the feed fluid tanks (1, 2).

The procedures for building the initial level (L) of the feed fluid tanks (1, 2) are: first making sure the fluid supply quick connector (34) and gas supply quick connector (35) are properly made, respectively with the fluid supply source (3) and the gas supply source (4), then opening the two fluid inlet isolation valves (23, 24) installed at the fluid inlet pipe (41), the two gas inlet isolation valves (25, 26) installed at the gas inlet pipe (42), as well as the venting isolation valve (32), then through the fluid supply source (3) feeding the fluid to be fed to the external system (8) simultaneously into the two feed fluid tanks (1, 2), till the level ($L_1$, $L_2$) reaches a preset initial high-level (9) and then closing the fluid inlet isolation valves (23, 24) and the venting isolation valve (32). Since the operation of the fluid feeding from the above-mentioned fluid supply source (3) is performed with the tank pressure being close to that of the atmosphere, it can be easily accomplished through gravity, pumps or other low-pressure fluid supply source.

The procedures for building the initial pressure (P) of the feed fluid tanks (1, 2) are: first verifying that the two gas inlet isolation valves (25, 26) at the gas inlet pipe (42) are opened, then increasing pressure of the two tanks from the gas supply source (4), bringing the tank pressure up to a certain preset value higher than that of the external system (8), and then closing the two gas inlet isolation valves (25, 26). The pressure value of the above-mentioned gas supply source (4) should depend on the pressure of the external system (8); normally high pressure gas cylinder or air compressor is used, or both combined, in building up the pressure of the feed fluid tanks (1, 2).

Once the first and second feed fluid tanks (1, 2) are built to the above-mentioned preset initial high level (9) and pressure, the two feed fluid tanks (1, 2) are at the initial standby state. The fluid feed function can be activated by opening the first tank feed fluid isolation valve (27), and bringing the feed fluid in the feed fluid tank through the flow control valve (6) installed at the feed fluid pipe (45) to the external system (8), and the tank pressure can be maintained, or replenished at time of fluid feed operation, depending on actual needs, by automatic or manual pressure regulator (not shown). When the preset lowest-level (10) warning signal $L_1$ (Lo) is indicated, the first tank feed fluid isolation valve (27) is immediately closed, with the second tank feed fluid isolation valve (28) being simultaneously opened, and the fluid in the second feed fluid tank (2) continues feeding into the external system (8). By doing so, not only can the gas inside the tanks be prevented from entering the external system (8) by incident, but also the first feed fluid tank (1) can be rebuilt to the initial standby state while the second feed fluid tank (2) continues with the fluid feeding. By the actions of switching between the two feed fluid tanks (1, 2), the function of continuous fluid feeding can be achieved.

The methods for controlling the automatic switching between the two tanks in the fluid feeding process are: through the preset lowest-level signal $L_1$ (Lo), $L_2$ (Lo) previously built in the control unit (50) for triggering the switching actions, while comparing the signals against the level signals acquired on-line through measuring, when the signals for triggering switch actions are reached, the control unit (50) immediately gives commands to devices driven by human-machine interface (e.g. power on/off of the electric isolation valve), prompting the two feed fluid isolation valves (27, 28) in charge of the switching actions to simultaneously change the open/close states, thus achieving the function of automatic switching between the two feed fluid tanks (1, 2).

The methods for controlling automatic fluid feeding in the fluid feeding process are: through the preset action timing and sequence and measuring triggering signal previously built in the control unit (50) for each isolation valve of different functions, while comparing the signals against those acquired on-line through measuring the key parameters of the present invention and the external systems; when an action triggering signal is reached, the control unit (50) will give commends to devices driven by human-machine interface (e.g. power on/off of electric isolation valve), prompting the isolation valves in charge of the actions to change the open/close states, thus achieving the function of automatic fluid feeding. The signals triggering opening/closing actions of each isolation valve are activated through the preset signals on the high/low level, $L_1$ (Hi), $L_1$ (Lo) and $L_2$ (Hi), $L_2$ (Lo), and the preset signals on the pressure $P_1$ (Lo), $P_1$ (Hi) and $P_2$ (Lo), $P_2$ (Hi) of the feed fluid tanks (1, 2), along with the timing and sequence of the actions by each isolation valve.

Figure 4A:
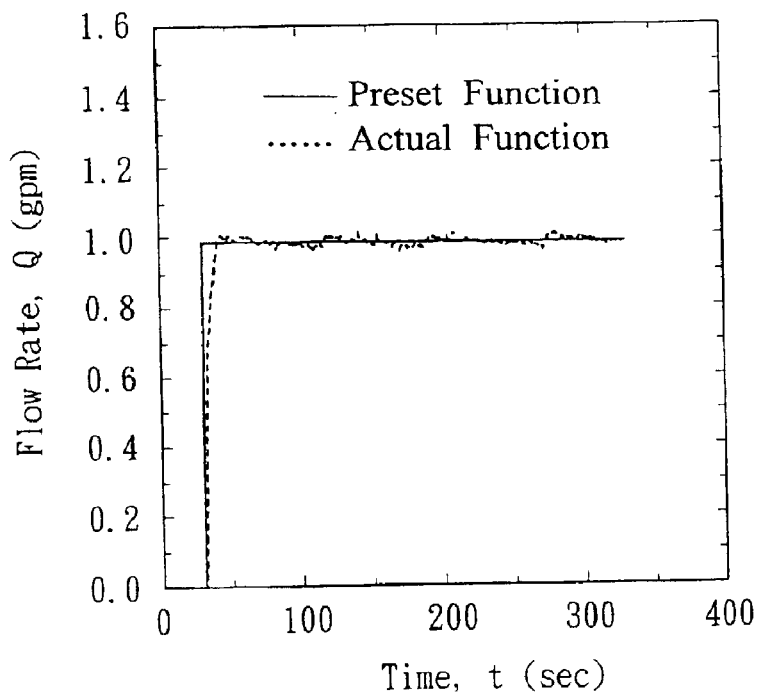
FIGS. 4(A) and 4(B) are characteristic diagrams showing the performance tests of the present invention: (A) single step function output response, (B) continuous step function output response.
Figure 4B:
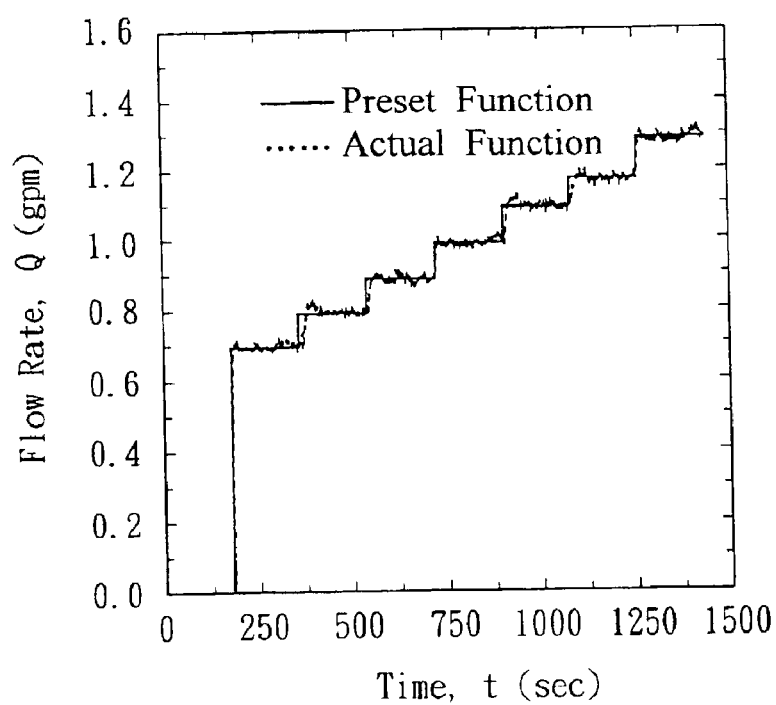

The flow rate (Q) stability and accuracy of the present invention have been individually verified in a power plant simulator (100) by high pressure hot water flowing system (305 psia, 217° C.), using cold water of room temperature as feed fluid, with performance tests including fluid feeding curve at different flow rates, for instance, the actual output responses by single step function as illustrated in FIG. 4(A) and continuous steps function as illustrated in FIG. 4(B). The results of the tests illustrated in FIGS. 4(A) and 4(B) show that: except at the instant when the preset flow rate (Q) data are being rapidly changed, when there appears to be a delay of the actual flow rate of the feed fluid in reaching the preset value, with the actual flow rate being measured by the flow meter, the fluid feeding system of the present invention, overall speaking, shows excellent performance regardless in the aspect of stability or accuracy. The reasons causing the actual flow rate of the feed fluid a delay in reaching the preset value may include: (i) at the instant when the feed fluid isolation valves (27, 28) are opened, the preset flow rate value of the feed fluid can surge suddenly from zero to another set value, while the actual flow rate (Q) cannot, due to known characteristic of viscosity of fluid, likewise, when the preset flow rate of the feed fluid suddenly increases from a relatively low value to another set value, (ii) the situation same as mentioned above, when rapid change on the preset flow rate causes sudden change of pressure differential on the two ends of the control valve, such that the regulation on the opening of the flow control valve (6) cannot correspond to the regulating of the flow meter (5) to reach the set value in timely manner. In case when the preset flow rate of the feed fluid is a set value, the actual flow rate (Q) still fluctuates slightly but frequently, which may be caused by the vibration waves from evaporation when the injected cold water meeting with the hot water in the power plant simulator (100).

Figure 5:
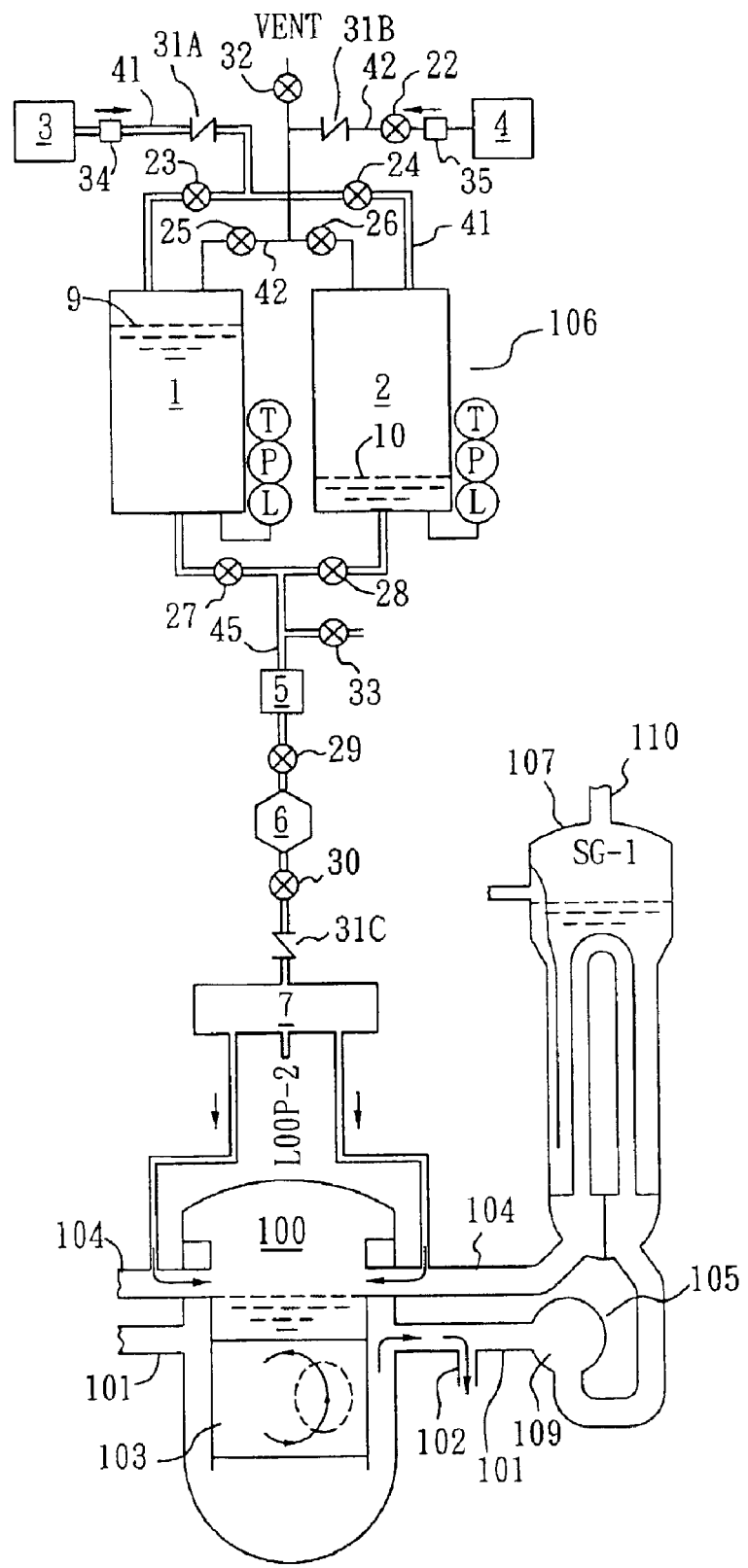
FIG. 5 is a characteristic diagram showing an application example of simulating power plant high-pressure water injection system according to the present invention.

FIG. 5 shows an application example of the present invention in the power plant simulator (100) for simulating a high pressure water injection system (106), wherein the simulator (100) is scaled down from the Westinghouse three-loop pressurized water reactor based on scaling criterion to reduce its volume to ¹⁄₄₀₀. The present application example simulates, in the simulator (100), a loss-of-coolant accident caused by a small break (102) at the cold leg (101), causing the reactor pressure (P) to lower; until when the pressure lowers to the preset high pressure water injection signal (about 70% of the highest pressure ($P_0$) for water injection of the high pressure injection system), the device of the present invention is activated to simulate the high pressure water injection system of the power plant. The automatic fluid feed switching and control system of the present invention (106), by injecting high pressure cooling water to the reactor core (103), through the hot-leg (104) inlet of the three symmetrical cooling loops (105) in the simulator (100), fulfills the cooling effect by removing the decay heat, with the high pressure water injection system (106) continuing with the operating until the power plant system pressure lowers to the preset signals for stopping high pressure water injection (about 30% of the highest pressure ($P_0$) for water injection of the high pressure injection system). As mentioned above, regarding the fluid feed simulation system in the pilot plant, the accuracy of feed-water flow rate (Q) in high-pressure water injection simulation is critical to the preciseness of simulating the development of an incident. Because the feed-water flow rate of high pressure water injection in power plant is driven by pumps of high head and high pressure, while the water injecting to the reactor core follows the performance curve of the pumps, as a result, the feed-water flow rate (Q) should vary with the performance curve of the pumps which rises when the pressure (P) of the reactor falls.

The present application example adapts the two calibration curves of the pressure transmitter that monitors the system pressure (P) of the power plant simulator, and the orifice plate (5) that monitors the feed water flow rate (Q) of the present invention, and the performance curve of the feed water pumps showing that feed water flow rate (Q) in the power plant simulator varies with the system pressure (P), and builds these data in the control unit (50), wherein the flow rate (Q) is obtained through the pressure differential as measured by the pressure transmitter installed at both ends of the orifice plate (5), while comparing the data against the calibration curve of the orifice plate. The pressure in the two feed fluid tanks (1, 2) is built by adapting high pressure nitrogen cylinder (4), and, during the incident transient, the function of continuous water injection is achieved through the automatic switching and operation of the two feed fluid tanks (1, 2).

Figure 6:
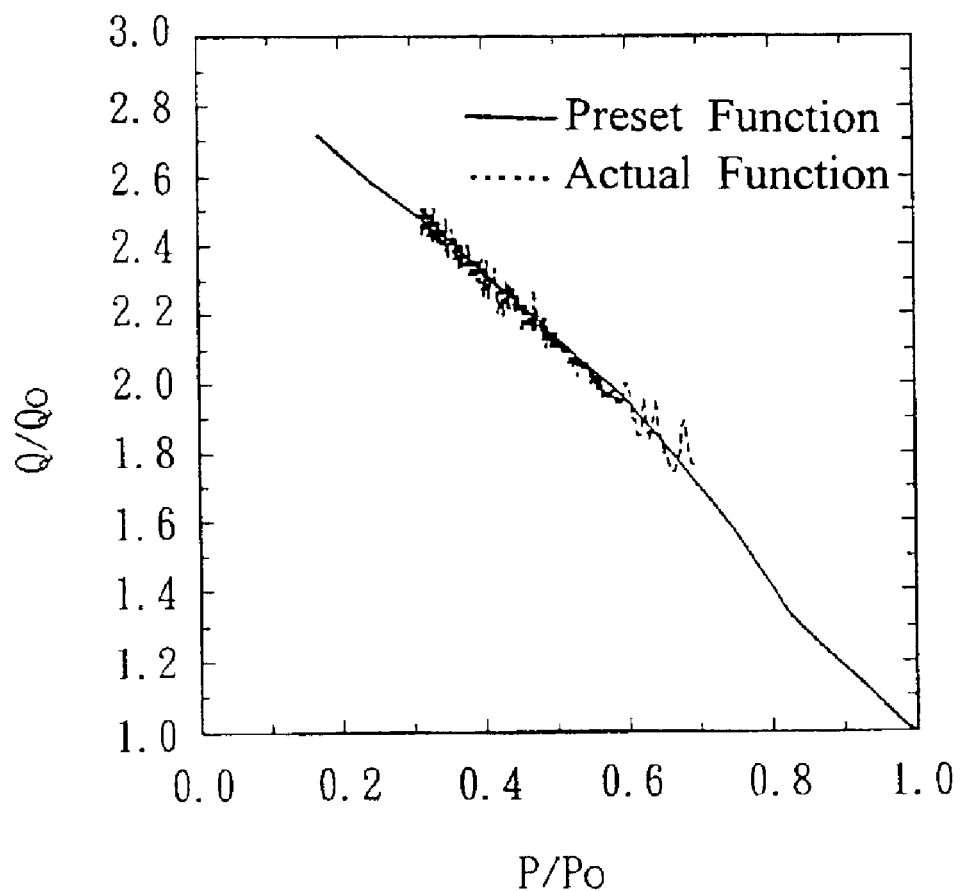
FIG. 6 is a characteristic diagram showing water feeding flow rate vs. system pressure simulation test according to the present invention.

FIG. 6 shows the actual variations of feed water flow rate (Q) with the system pressure (P), throughout the simulation in the power plant simulator (100) on a loss-of-coolant accident, with the data compared against the performance curve of the pumps used in the simulation of the high-pressure water injection system (106) in a power plant. The Y-axis $Q/Q_0$ as shown in FIG. 6 represents the ratio of actual feed water flow rate (Q) vs. the highest flow rate (Qo) for water injection of the high-pressure injection system. As mentioned above, the result shows greater fluctuation at the instant of system activating or switching, due to the sudden change of the feed-water flow rate, particularly at the initial period of time. Apart from the causes as analyzed in FIG. 4, this test shows greater fluctuation of the feed-water flow rate (Q) than the previous performance test by step function correlation, due to the sophisticated boiling flow phenomenon in the loss-of-coolant accident when system pressure falls because of a small break. Overall speaking, the quality of long term fluid feeding and the extent of matching with the performance curve of the pumps in the water injection simulation have accomplished high extent of standard.

The experience obtained through practicing the present application example shows that if the pressure of the feed fluid tanks (1, 2) can be kept at 30~50 psi higher than that of the external system, following the downward curving trend of the pressure of the external system throughout the incident transient (that is, no pressurizing to the feed fluid tanks (1, 2) needed during water injection), then the control on feed-water flow rate (Q) can be much more stable, compared with the case when nitrogen is continuously injected to keep the tank pressure at the initial set value; thus, the nitrogen consumption can be reduced tremendously. The above-mentioned function can be applicable in building the preset high-pressure $P_1$ (Hi) of the feed-water tanks at 30~50 psi higher than that of the external system, for the following reasons: although the pressure of feed fluid tanks (1, 2) will lower in proportion with the lowering of the water level during water injection, yet with the opening of the flow control valve (6) being regulated automatically according to the requirements of the feed fluid flow rate (Q), the accuracy of the feed fluid flow rate is almost not affected by the tank pressure.

Figure 7:
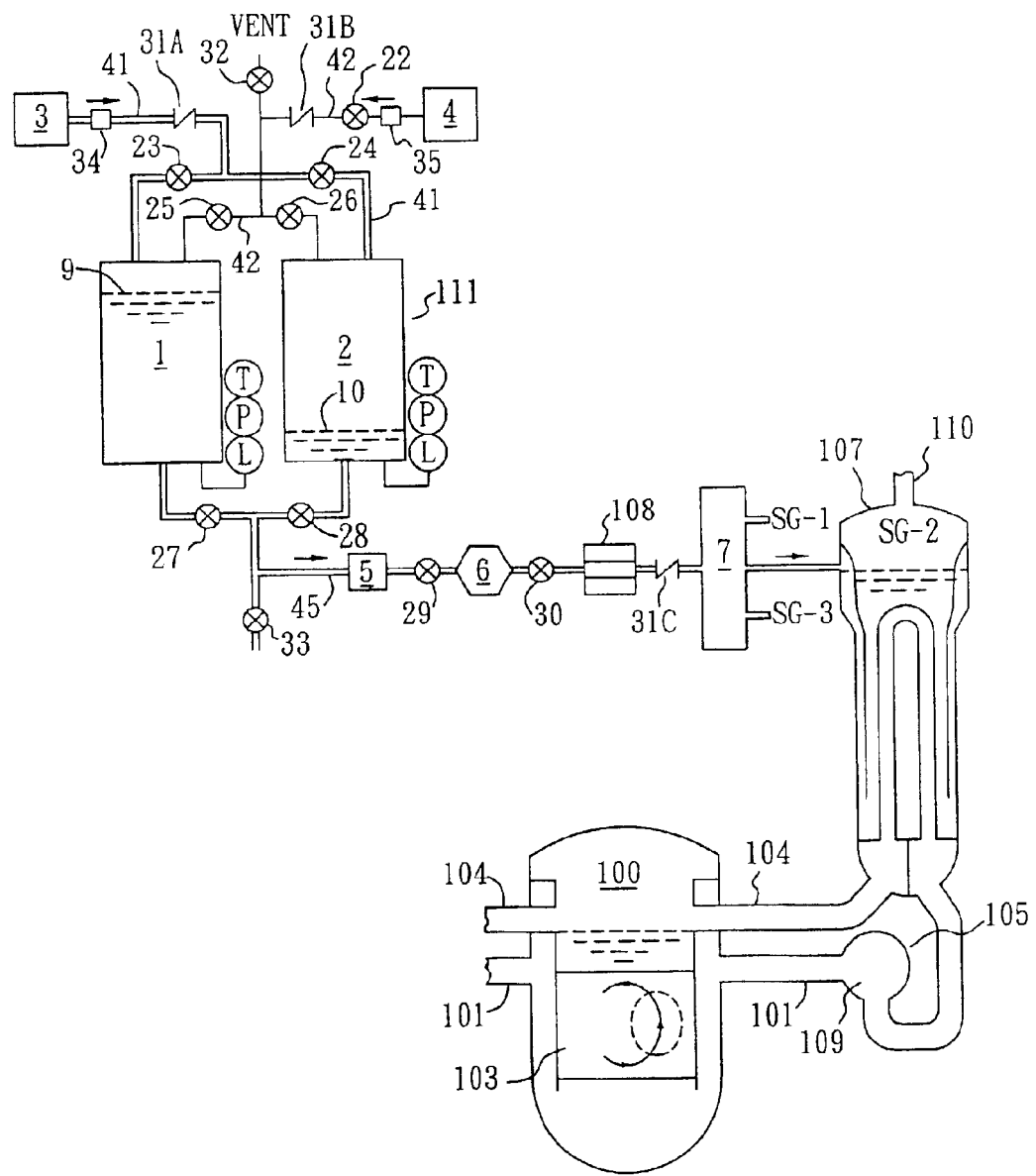
FIG. 7 is a characteristic diagram showing an application example of simulating steam generator feed water and level control according to the present invention.

FIG. 7 shows an application example of the present invention in power generating system, with a steam generator feed-water and level control system (111) on each cooling loop (105). During the operation of power generating system, the heat removed from the reactor core (103) brings boiling flow phenomenon to the cooling water of the steam generator (107), the generated steam therein can be gathered through the steam outlet (110) to propel the turbine set and drive the power generator; hence, stable control of the water level in the steam generator (107) over a long period of time is a critical issue for keeping the power plants running properly. On the other hand, if the above-mentioned steam generator (107) interrupts its feed water by any reason, resulting in deviation from safety level and the failure of the heat removing function, the consequences will be the severe damage to the reactor core (103) due to overheat. At present, the feed-water system of the power plant adapts high-head and high-pressure pumps for performing the water feeding operation, so as to maintain its normal power generating function. However, as mentioned above, in many incidents, the power supply is often cut off (such as the station blackout incident). The automatic and continuous fluid feeding system of the present invention can do without high-head and high-pressure pumps, needing no high rating power supply for normal or emergency use but relatively low rating power supply for instrumentation, low pressure water supply (3) and high pressure gas supply (4) to perform equivalent extent of functionality, and yet it is superior to the conventional skills in terms of reliability, thus more applicable in the incident-related fields for its better fluid feeding performance.

The performance test of the present invention has been undertaken in the power plant simulator (100) to test its functions and controlling ability by simulating the power plant steam generator (107) and feed-water and level control system. To avoid excessive temperature differentials between the feed-water and the cooling water of the steam generator (107) that can interfere with the water temperature and the steam generating volume, and further affect the heat transmission, prior to feeding into the steam generator, the flow of cold feed-water in the feed fluid tanks (1, 2) is preheated according to the vaporization rate of the cooling water in steam generator (107), with the feed-water flowing through the pre-heater (108) being 40° C. lower than the temperature of the water in the steam generator (107). Through the automatic regulating and feed fluid tanks (1, 2) switching functions of the present invention, the high-pressure and high-temperature feed-water can continuously and accurately feed into the inlets of steam generators installed respectively on the three symmetric loops (105), achieving the function of maintaining the normal water level (L) over a long period of time. The present invention builds into its control unit (50) the following data: pressure transmitter that monitors the level (L) of the steam generator (107), the orifice plate that monitors the feed-water flow rate (Q), the temperature (T) of the feed-water that flows through the pre-heater (108), calibration curve of the sets of transmitters, and the height of the fluid level (L) to be controlled, etc. Through the mechanism of cyclic switching, and fluid feeding of the two feed fluid tanks (1, 2), the system achieves the stable and continuous automatic water feeding functions of steam generators.

Although the present invention has been illustrated in the above by way of describing the prominent characteristics and operation procedures of this multifunction passive and continuous fluid feeding system, as well as its application examples, where the advantages are made comprehensible, it is to be noted that the invention is not to be limited to what is embodied herein, as the present invention, according to what is described above, can vary in its details in many ways within the scope of the appended claims.

What is claimed is:

1. A multifunction passive and continuous fluid feeding system connected with an external system, a gas supply source, and a fluid supply source, wherein the system comprises:

a set of storing and transmitting components, including:

at least two independent feed fluid tanks for storing and pressurizing, to accommodate the fluid to be fed into the external system;

a set of transmission pipe lines, with a feed fluid pipe therein being connected with the feed fluid tanks, and, respectively connecting to the fluid supply source, the gas supply source, and the external system; and measuring and regulating components, including:

a flow control valve installed on the feed fluid pipe, for regulating the flow rate of the feed fluid, and the flow control valve is further connected with a throttle valve at both ends thereof; and several sets of measuring instruments, separately installed on the feed fluid tanks, for monitoring the state of the fluid therein while putting out original signals.

2. The system as claimed in claim 1, further comprising a control unit with built-in information, including:

at least an input signal module, for acquiring signals of each set of measuring instrument;

at least an output signal module, for delivering control signals to rectify the opening of the valves;

a signal transmitter, for transmitting and receiving the signals;

a data acquisition and controller, for gathering instantaneously the original signals of each measuring unit and converting the signals into physical quantities, and comparing against the built-in data preset in the control unit to judge and give commands for actions.

3. The system as claimed in claim 1, wherein the storing and transmission component further includes several check valves, individually installed on each transmission pipe line, such that the fluid in the feed fluid tanks will not flow to the fluid supply source and the gas supply source, and that the fluid in the external system will not flow back to the feed fluid tanks.

4. The system as claimed in claim 2, wherein the built-in information in the control unit includes: the data needed for measuring and testing, data on feed fluid control requirements demanded by the external systems, and the data enabling the system to perform the functions of automatic control and continuous fluid feeding.

5. The system as claimed in claim 1, wherein the fluid supplied into the feed fluid tank is operated under the pressure as low as near the atmospheric pressure.

6. The system as claimed in claim 1, wherein the gas supply source is an air compressor.

7. The system as claimed in claim 1, wherein the gas supply source is a high pressure gas cylinder.

8. The system as claimed in claim 1, wherein the feed fluid pipe has a fluid inlet, located close to the external system, the fluid inlet has a pressure-balancing pipe and connects to one or several branch pipes, for delivering feed fluid to various locations in the external system.

* * * * *